INVENTOR.
CARL F. GROMME,
BY
ATTORNEYS.

FIG. 3.

INVENTOR.
CARL F. GROMME,
BY
ATTORNEYS.

Jan. 1, 1963        C. F. GROMME        3,071,123
INTERNAL COMBUSTION ENGINE
Filed Sept. 15, 1960        8 Sheets-Sheet 4

INVENTOR.
CARL F. GROMME,
BY
Allen & Allen
ATTORNEYS.

Fig. 6.

INVENTOR.
CARL F. GROMME,
BY
Allen & Allen
ATTORNEYS.

INVENTOR.
CARL F. GROMME,
BY
ATTORNEYS.

"A" IS THE CURVE OF FREE OPEN AREA OF POPPET.
"B" IS THE CURVE OF FREE OPEN AREA OF CONTROL SLEEVE PORT 8 DURING INTAKE.
"C" IS THE CURVE OF FREE OPEN AREA OF CONTROL SLEEVE PORT 8 DURING EXHAUST.
"D" IS THE CURVE OF FREE OPEN AREA OF CONTROL SLEEVE PORT 35.
"E" IS THE CURVE OF FREE OPEN AREA OF CONTROL SLEEVE PORT 36.

INVENTOR.
CARL F. GROMME,
ATTORNEYS.

United States Patent Office 3,071,123
Patented Jan. 1, 1963

3,071,123
INTERNAL COMBUSTION ENGINE
Carl F. Gromme, P.O. Box 654, Kentfield, Calif.
Filed Sept. 15, 1960, Ser. No. 56,277
16 Claims. (Cl. 123—79)

This invention relates to a new and improved construction for internal combustion engines, and relates more specifically to a four stroke cycle internal combustion engine employing spark ignition.

A principal object of the instant invention is to make possible the use of only a single poppet type valve for each engine cylinder for both intake and exhaust without incurring loss of fuel due to unused portions of the fuel passing through the engine exhaust system.

Another object of the invention is to make possible the use of high compression ratios in ordinary engine usage without the necessity of special fuels, thereby permitting the successful use of fuels having a wide range of knock "sensitivity."

A further object of the invention is the construction of an internal combustion engine which will permit the use of the leanest possible fuel and air mixture capable of combustion, thereby obtaining the closest possible approach to the theoretical "air cycle" which represents the limit of attainable thermal efficiencies of the explosion cycle.

Still another object of the instant invention is the provision of a combustion chamber with the spark ignition at or near the geometric center of the chamber, the design of the combustion chamber being such as to minimize the length of flame travel commensurate with engine size and yet not necessarily limiting usable engine sizes.

Still a further object of the instant invention is the provision of a centrally disposed spark ignition system formed as an integral part of the poppet valve, such spark ignition system coacting with the aforementioned combustion chamber to encourage more complete burning of the fuel and hence more efficient operation.

Still a further object of the invention is the provision of an intake and exhaust system for such engine which incorporates a rotary sleeve surrounding the stem of each poppet valve, each rotary sleeve having a plurality of ports therein arranged to be sequentially opened and closed in timed relation to the movement of the poppet valve with which it is associated.

Yet a further object of the instant invention is the provision of an intake and exhaust system in which a ported sleeve rotated in timed relation to the movement of the poppet valve and engine piston makes possible a high degree of supplementary internal cooling to insure maintenance of minimum practicable initial temperatures of the combustion charge and at the same time eliminate most, if not all, of the products of combustion from the engine cylinder prior to the induction of a fresh charge.

Still a further object of the instant invention is the provision of an intake and exhaust system of the character described which makes it possible to maintain a valve temperature sufficiently low to eliminate troublesome "hot-spots" and also low enough to arrest oxidation of the valve when lean fuel mixtures are employed.

Yet a further object of the invention is to achieve the aforementioned objectives while maintaining the use of a conventional valve operation system such as cam operated push rods and rockers or overhead cams and rockers; and to maintain an engine conforming in as many respects as possible to current practices in conventional internal combustion engine.

The foregoing objectives, together with others which will be pointed out hereinafter or which will be apparent to the skilled worker in the art upon reading these specifications, are accomplished by that construction and arrangement of parts of which I shall now describe an exemplary embodiment.

Reference is now made to the accompanying drawings wherein.

General Organization and Operation

Figure 1:
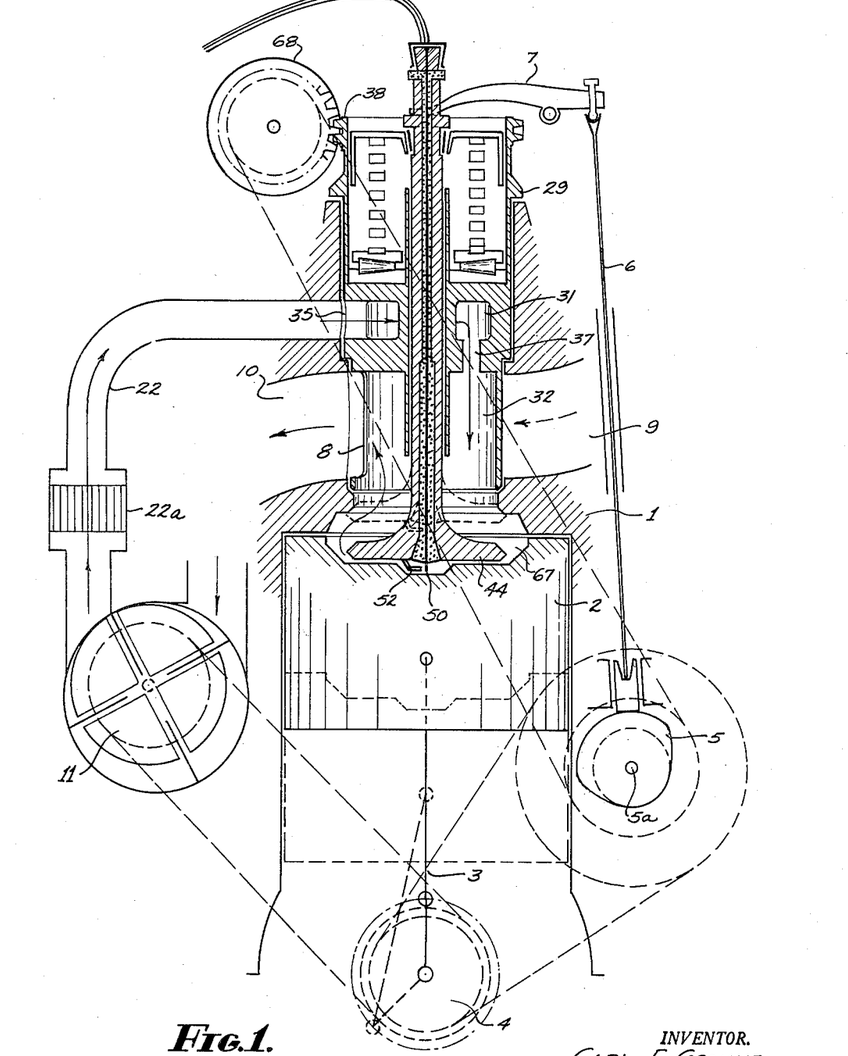
FIGURE 1 is a schematic representation of an engine cylinder embodying my invention.

Reference is first made to FIGURE 1 of the drawings wherein I have schematically illustrated a single engine cylinder embodying my invention; but it is to be understood that the instant invention is applicable both to single cylinder and multiple cylinder four cycle engines. As seen therein, the engine comprises a cylinder block, and a piston 2 having a connecting rod 3 operatively connecting it to the engine crank shaft 4. A ported rotatable control sleeve 29 is provided directly above and in axial alignment with the piston 2; and in the center of this sleeve is mounted a single hollow stemmed poppet valve 44 having the spark ignition elements 50 and 52 mounted centrally on its face. The poppet valve is slidably and rotatably journaled in the control sleeve and adapted to be actuated by means of a conventional cam 5 driven in timed relation to the engine crank shaft 4, the cam acting through a push rod 6 and rocker mechanism 7 to open and close the poppet valve. The control sleeve 29 is adapted to be rotated in timed relation to the cam 5 and the crank shaft 4 by means of helical gears 38 and 68, the latter being conveniently driven from the shaft 5a mounting valve actuating cam 5. The control sleeve has a primary port 8 which, as the sleeve is rotated, alternately opens to the intake manifold 9 and the exhaust manifold 10. It will be understood that an air-fuel mixture will be delivered to the intake manifold 9 from a suitable carburetor or fuel-injection system which forms no part of the instant invention. However, in my copending application Serial No. 839,096, filed September 10, 1959, and entitled Low Pressure Fuel Distribution System, I have taught a fuel-injection system particularly suited for use in conjunction with the instant engine.

Fuel entering the control sleeve through the port 9 passes through the valve chamber 32 and into the combustion chamber 67. It will be understood, of course, that the poppet valve will be open at this juncture, as illustrated in solid lines, and that the piston 2 will be retracted and in the position illustrated in dotted lines.

As the poppet closes on the compression stroke of the engine, the port 8 will pass beyond the intake manifold 9 and will subsequently come into communication with the exhaust manifold 10 as the poppet valve reopens to discharge the products of combustion.

However, in order to fulfill a number of the objectives of the instant invention, I provide a secondary air system consisting of a blower 11, which may be conveniently driven from the engine crank shaft 4, the output of the blower being directed through a duct 22 leading to an intermediate chamber 31 in the control sleeve. If desired, the duct 22 may be provided with a heat exchange device 22a for either heating or cooling the air generated by the blower 11, depending upon the conditions under which the engine is being operated. In any event, the chamber 31 is provided with a pair of spaced apart ports, one of which is indicated at 35, which are adapted to be sequentially presented to the duct 22 so that two distinct charges of air will be introduced into the chamber 31 and from it into the valve chamber 32 through a series of passageways, one of which is indicated at 37.

The timing of the parts is such that the poppet valve will close, i.e., move to the position illustrated in dotted lines, at the end of the intake cycle but prior to the time the port 8 passes beyond the intake manifold 9. That is, the lowermost valve chamber 32 will still be in communication with the intake manifold 9 after the poppet valve has sealed-off the combustion chamber; and it is at this juncture that the intermediate chamber 31 receives the first increment of air from the duct 22. This increment of air, which I shall call "clearing air," acts to force any residual air-fuel mixture in the valve chamber 32 back through port 8 into the intake manifold 9. Thus, residual fuel in the valve chamber which would otherwise be wasted and subsequently expelled through the exhaust manifold is reclaimed for subsequent use during the next intake stroke in the case of a single cylinder or for use by another cylinder in the case of a multiple cylinder engine. Actually, the "clearing air" serves three purposes. In addition to salvaging unused fuel, when the main port 8 of the sleeve starts to open to the exhaust side—which will occur early during the expansion or power stroke—the "clearing air" will expand into the exhaust system to prevent "blow-back" of exhaust gases from the exhaust manifold into the valve chamber 32; and the air also serves to cool the valve.

The second port in the intermediate chamber 31 comes into play during the exhaust cycle and serves to introduce what I shall call "scavenging air" since it blasts out the products of combustion both from the combustion chamber 67 and the valve chamber 32 so that these areas are virtually free from burned fuel and air and other products of combustion at the beginning of the next succeeding induction stroke. The "scavenging air" is also an important factor in reducing the temperature of the valve as well as the control sleeve.

With the foregoing general operation of the engine in mind, I shall now turn to a more detailed description of its construction and operation.

*Engine Block and Control Sleeve Mounting*

Figure 2:
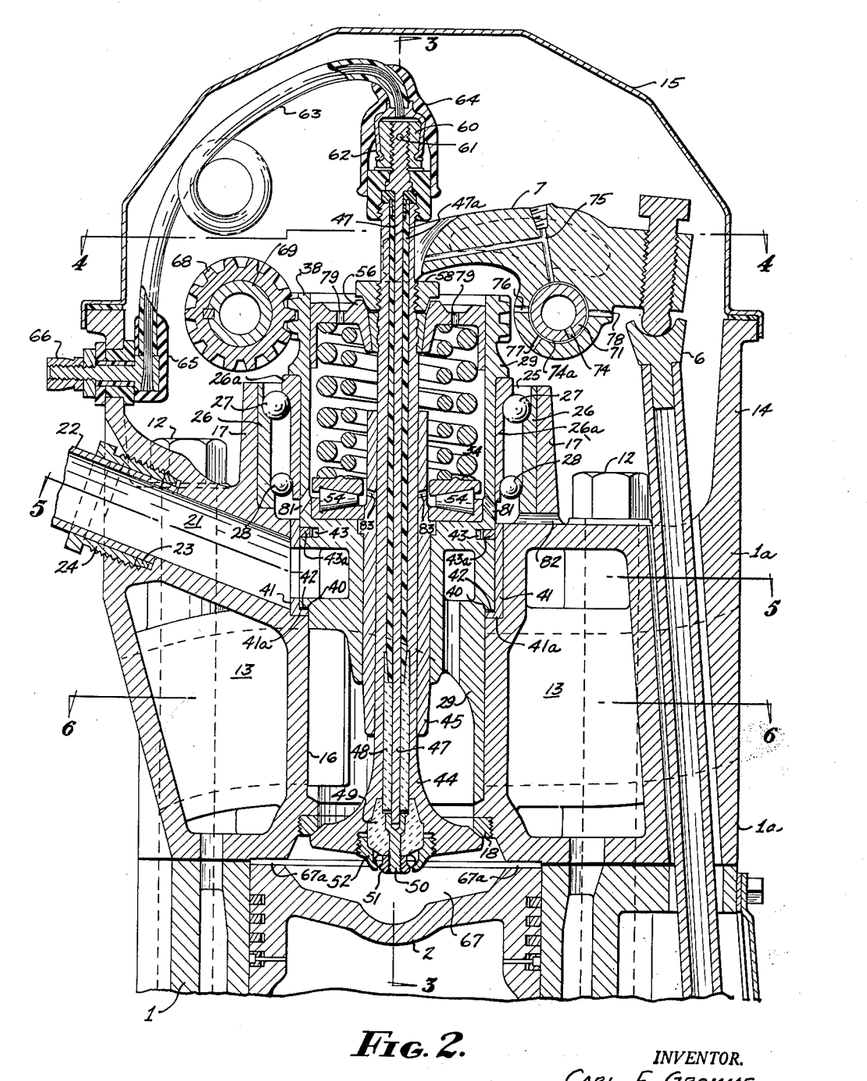
FIGURE 2 is a vertical cross-sectional view taken along the line 2—2 of FIGURE 3.

Referring to FIGURE 2 of the drawings, I have shown the engine block as consisting of a cylinder block 1 having a separate head block 1a securely bolted together as shown at 12. Preferably, the head block 1a will be a one-piece casting having integrally formed waterways 13 for liquid cooling and a raised rim 14 which acts as an oil basin and also serves as a supporting flange for attachment of the cover 15. The head block is also provided with a cylindrical bore 16 centered on the axis of the piston 2, there being a bore 16 for each cylinder of the engine; the bores so formed serving to receive the control sleeve 29.

Each of the bores 16 is surrounded at its upper end by a collar 17 formed integrally with the head block and which as will be explained more fully hereinafter, serves a mounting ring for the sleeve bearing assembly 25. At the lower end of the bore 16 is a valve seat 18 which, preferably, is formed as a separate insert threaded into the head block 1a, although the seat may be integrally formed in the casting if so desired.

Figure 6:
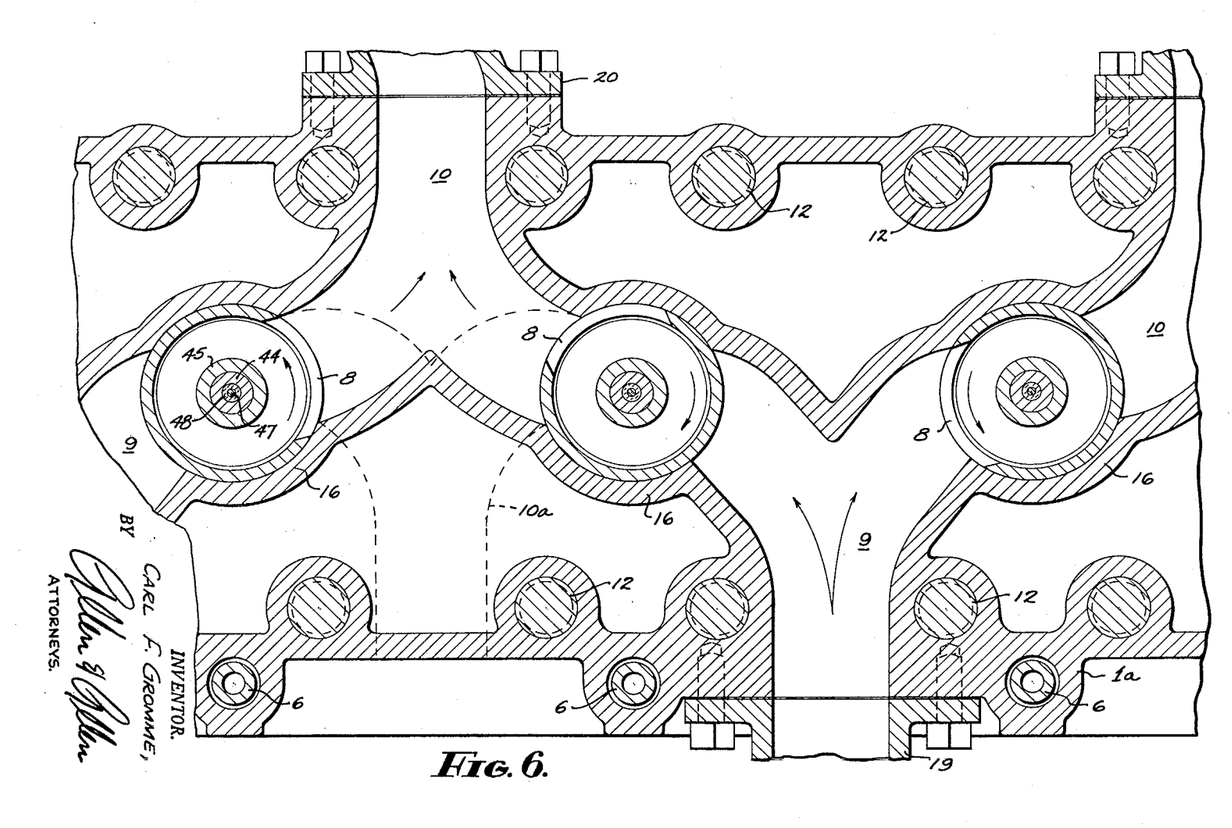
FIGURE 6 is a horizontal sectional view taken along the line 6—6 of FIGURE 3.

As seen in FIGURE 6, the head block 1a is also provided with intake passages 9 and exhaust passages 10 connected respectively to intake manifold 19 and exhaust manifold 20. The intake and the exhaust passages communicate with opposite sides of the sleeve receiving bores 16; and I have shown both passages as "twinned" to permit each passage to feed two adjacent cylinders, which is common practice in multiple cylinder engines. I also prefer to have the intake and exhaust passages on opposite sides of the engine; but if desired, they could easily be placed on the same side by locating the exhaust passages as shown by the dotted lines and indicated by the reference numeral 10a.

Figure 5:
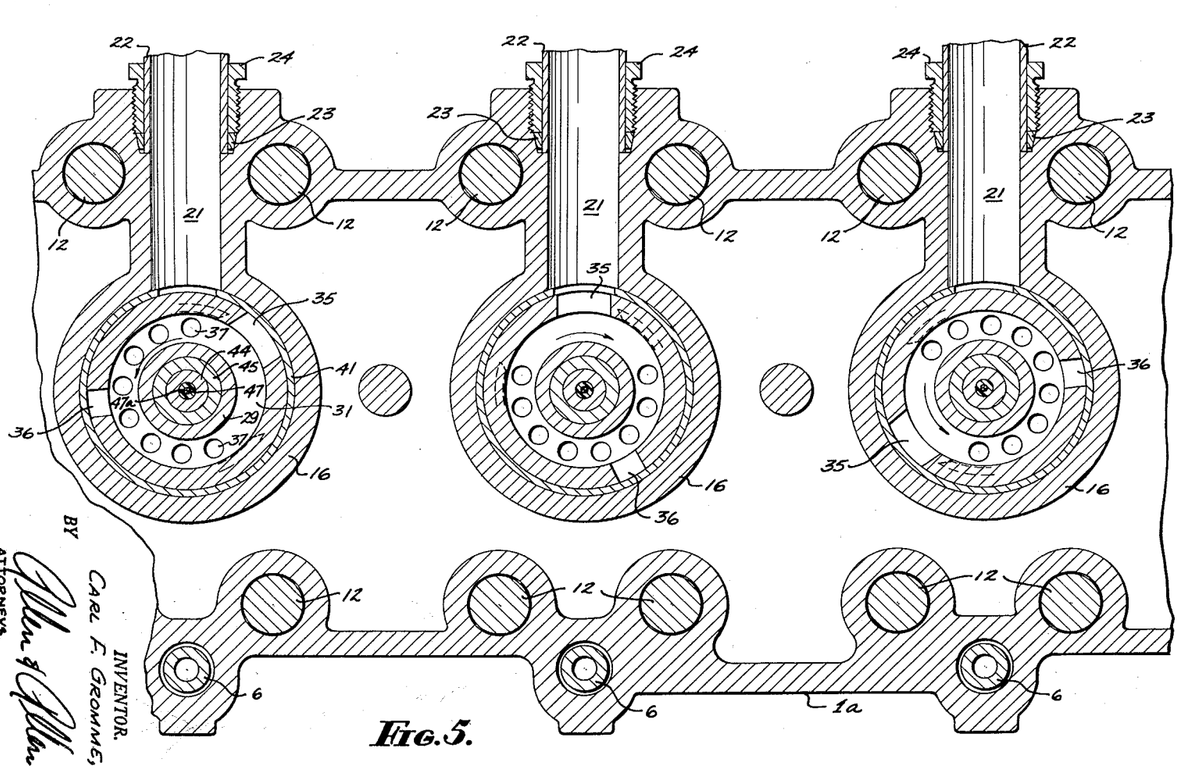
FIGURE 5 is a horizontal sectional view taken along the line 5—5 of FIGURE 3.

As seen in FIGURES 2 and 5, the head block is also bored to provide a passage 21 leading to each bore 16 for the secondary air system; and preferably such passages are bored on a slant to avoid as much as possible any interference with the waterways 13. The secondary air ducts 22 (see FIGURE 1) are connected to the outermost ends of passages 21 and held securely in place by the tapered split rings 23 which are compressed by the lock nuts 24.

Referring again to FIGURE 2, the collar 17 serves as a seat for the bearing assembly 25 which receives the control sleeve 29, the bearing assembly comprising an outer member 26 snugly received within the collar 17 and an inner member 26a surrounding and secured to the control sleeve 29. The members 26 and 26a coact to provide spaced apart raceways for the rows of ball bearings 27 and 28. The upper and larger ball bearings 27 serve to absorb the longitudinal thrust exerted on the control sleeve by the rocker 7 in opening and closing the poppet valve. The lower row of smaller ball bearings 28 acts purely as an essentially frictionless rotative bearing, and serves to maintain both the ball bearings and the control sleeve in precise alignment. While I prefer ball bearings for greater simplicity, it will be understood that roller bearings of suitable design could be employed if so desired.

*The Control Sleeve*

The control sleeve 29 is shown in greatest detail in FIGURES 7 through 10. Basically, it comprises an elongated sleeve divided into three interconnected chambers or zones, the upper chamber 30 housing the valve spring mechanism to be described hereinafter, the central or intermediate chamber 31 providing an annular passage for the entry of secondary air for both clearing and scavenging purposes, and the lower zone forming a valve chamber 32. It will be noted that the upper chamber 30 and the lower valve chamber 32 are essentially in the form of hollow sockets, whereas the central chamber is in the form of an annular passageway; the solid portion of the sleeve in the center of the annular passageway being provided with a longitudinal bore 33 which receives a valve guide or bearing, also to be described hereinafter.

Figure 8:
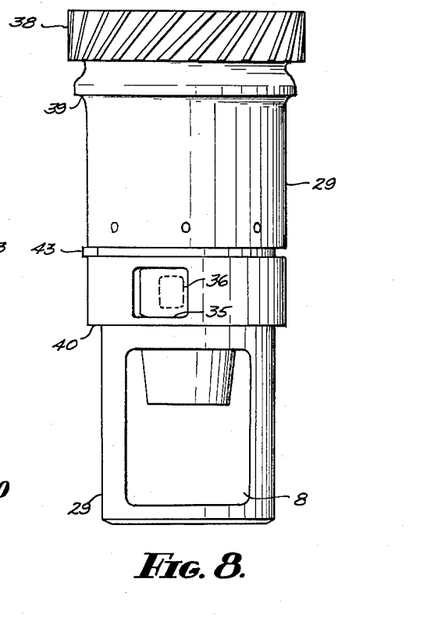
FIGURE 8 is a side elevation view of the said control sleeve.
Figure 9:
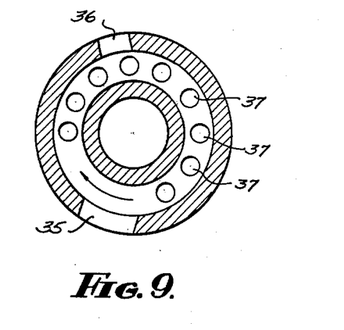
FIGURE 9 is a cross-sectional view of the control sleeve taken along the line 9—9 of FIGURE 7.
Figure 10:
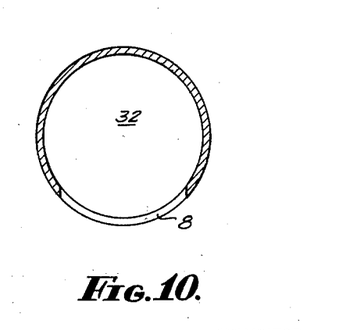
FIGURE 10 is a cross-sectional view taken along the line 10—10 of FIGURE 7.

As seen in FIGURES 8 and 10, the valve chamber 32 is provided with the single, relatively large port 8; and it will be remembered that it is this port through which fuel is introduced into the combustion chamber and the hot exhaust gases subsequently expelled therefrom and, as seen in FIGURES 8 and 9, the central annular chamber 31 is provided with a first port 35 which will be juxtaposed to the passageway 21 in the head block during the exhaust stroke of the engine to allow the introduction of the "scavenging air"; and a second and slightly smaller port 36 is also provided which, when juxtaposed to the passage 21, allows entry of the "clearing air" which, it will be remembered, enters while the main port 8 is still in communication with the intake passages 9 but after the poppet valve 44 has closed, thereby forcing any fuel remaining in the valve chamber back into the intake passage for reuse.

Figure 7:
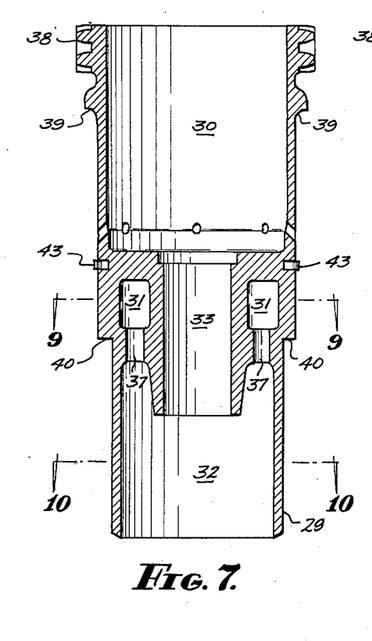
FIGURE 7 is a vertical sectional view of the control sleeve of my invention.

Communication between the annular chamber 31 and the valve chamber 32 is provided by means of a plurality of ports 37 extending vertically through the barrier wall between the two chambers, as will be seen in FIGURES 7 and 9; and preferably the aggregate area of the ports 37 is equal to the cross-sectional area of the port 35 so that there will be no undue build-up of pressure in the chamber 31. It is highly desirable that the incoming "scavenging air" and the exhaust gases interfere with each other as little as possible, and therefore I prefer to place the ports 37 on the side of the sleeve opposite the main port 8. In this fashion I also achieve a greater directional flow of air and more effective scavenging of exhaust products will result.

As diagrammatically illustrated at 22a in FIGURE 1 of the drawings, a heat exchanger may be provided to regulate the temperature of the air blasts in the event that the engine is to be operated in either very hot or very cold climates.

Referring again to FIGURES 7 and 8, the outer wall of the control sleeve is provided at its upper end with a helical drive gear 38 which may be integrally formed therewith, and just below the drive gear is a shoulder 39 which is adapted to seat against the upper edge of the inner bearing member 26a (see FIGURE 2). The upper portion of the sleeve has a slightly greater diameter than the lower portion, thereby providing a shoulder 40 which facilitates the sealing of the control sleeve relative to the bore 16. Thus, to effect a proper seal in the area of the secondary air inlet 21, I provide a bearing ring 41 (FIGURE 2) having an inturned flange on its lower end securely and rigidly fitted within the bore 16, the bore having an inwardly projecting shoulder 41a against which the bearing ring is seated. Between the upper surface of the flange and the shoulder 40 is placed a seal 42. The seal does not interfere with the free rotation of the control sleeve, but does prevent the passage of air or gases in either direction. Just above the ports 35 and 36 in annular groove 43 is provided a secondary ring 43a similar to a conventional piston ring which prevents leakage of air of gases in this direction.

The control sleeve 29 is fitted into the bore 16 with very close tolerances, excepting at its lower end where sufficient clearance is provided to allow for expansion due to temperature changes.

The Poppet Valve

The poppet valve 44 reciprocates and/or rotates in a valve guide 45 fitted within the bore 33 in the center of the control sleeve. Within the hollow stem 46 of the valve is located the electrode wire 47 surrounded by suitable insulating material 47a. For normal usage, #11 B & S gauge wire is called for and the insulation must be of the order of 500 volts per mil thickness. The insulation 47a may be a plastic material since the temperatures in this area will be moderate; although at the lower end of the valve I prefer to employ a section of ceramic insulating material 48, since higher temperatures will be encountered in this area. Similarly, to withstand the force of the exposion pressures, I provide a hardened ceramic plug 49 at the face of the valve within which is fitted the electrode 50, the inner end of which is slidably in contact with the electrode wire 47. Preferably, the electrode 50 is equipped with a nut 51 secured to the exposed tip thereof which serves to prevent the electrode 50 and the electrode wire 47 from being pushed back through the hollow valve stem under the forces of combustion. It will also be noted that the joints between the several sections of insulation are overlapping; this is both to permit movement due to temperature changes and to prevent the formation of an air gap between the electrode wire and the valve itself.

The valve 44 through its contacts at the valve seat 18, at the rocker 7, and at other points, forms the ground; and a grounded electrode 52 is provided which coacts with the insulated electrode 50 to form the spark gap. Preferably, the electrode 52 is threaded in place, as shown, and thereafter premanently secured by spot welding or brazing.

Figure 11:
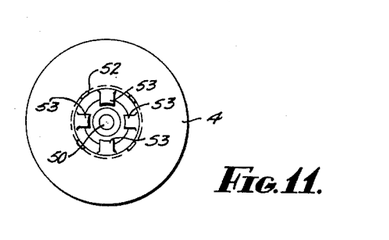
FIGURE 11 is a plan view of the face of the poppet valve showing the spark ignition electrodes.

As seen in FIGURE 11, which shows the face of the poppet valve, the insulated electrode 50 is in the center and is surrounded by the grounded electrode 52 which, preferably, is provided with four points 53 symmetrically arranged in spaced relation to electrode 50. Referring again to FIGURE 2 it will be noted that the grounded electrode 52 also provides a means for securing and maintaining the ceramic plug and the insulated electrode securely in place.

As noted earlier the upper chamber 30 in the control sleeve serve as a housing for the valve spring mechanism. As can be clearly seen in FIGURE 3, a set of tapered roller bearings 54 are seated at the base of the chamber 30, and a set of valve springs 55 seat against the roller bearings. At its upper ends the spring set is contacted by a spring retainer 56 held in place by a split collar 57 above which is threaded on the valve stem a flat topped hardened rest 58 for the valve rocker 7. With this arrangement, when the valve is closed and the friction between the valve head and the valve seat acts to hold the valve against rotation, the valve springs 55, the upper half of the roller bearing 54, the spring retainer 56, and the rocker rest 58 will all remain stationary relative to the lower half of the roller bearing assembly and the control sleeve, which will continue to rotate. Yet when the valve is opened, all of the parts will be free to rotate with the control sleeve.

Figure 3:
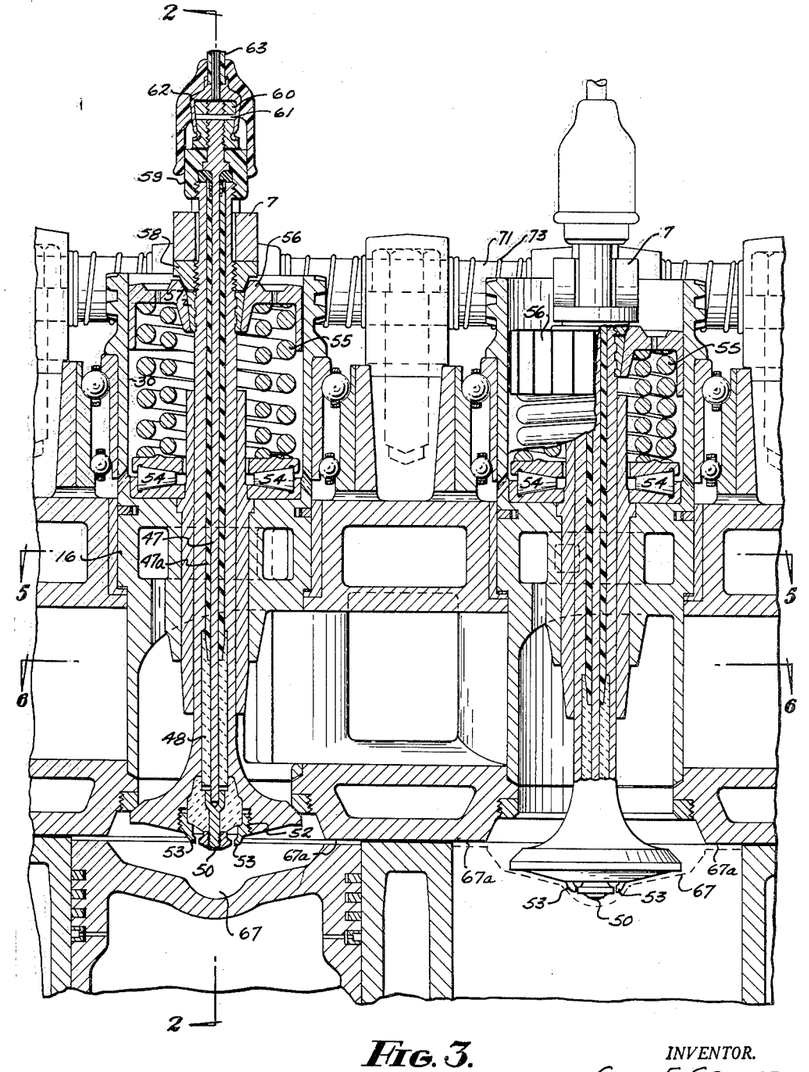
FIGURE 3 is a vertical sectional view taken along the line 3—3 of FIGURE 2 illustrating the construction and arrangement of parts in a multiple cylinder engine.

Secured to the upper end of the valve stem is a hard insulative cap 59 through which protrudes an end portion of the electrode wire 47 and to which a conductive metal cap 60 is secured and preferably pinned in place, as by pin 61. Preferably a spring bronze or brass clip 62 is clamped over the cap 60 so as to effect a perfect electrical connection without preventing free rotation of the valve assembly. A high tension lead 63 is securely fastened to the clip 62; and the upper end of the valve stem is preferably surrounded by a rubber cover or "umbrella" to seal the connection against lubricating oil since, it will be remembered, the connection is effected within the oil cover 15.

As seen in FIGURE 2, the high tension lead 63, which is shown looped to allow free response to the reciprocating action of the valve, extends and is fastened to a conventional connection 65 located adjacent the raised rim 14 of the head block 1a, which connection is completely insulated and oil tight. A terminal 66 outside the head block is provided with a conventional snap-on cap connector, such as are employed in conventional spark plugs; and this connector will receive the high tension lead from the distributor.

Drive Mechanism

Figure 4:
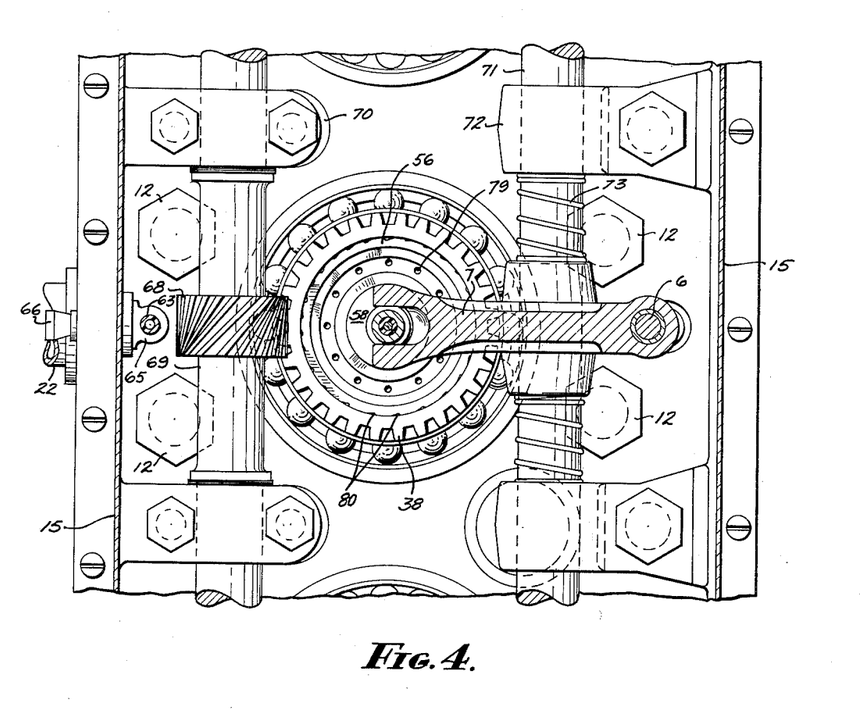
FIGURE 4 is a horizontal sectional view taken along the line 4—4 of FIGURE 2.

In FIGURE 4, I have shown in greater detail the helical drive mechanism for the control sleeve and the mounting of the rocker arm for actuating the poppet valve. The helical driving gear 68, which meshes with the helical gear 38 at the upper end of the control sleeve, is mounted on a shaft 69 suitably journaled in bearings 70. Since in a four cycle engine it is necessary for both the cam 5 and the control sleeve 29 to rotate at one-half crank shaft speed, I prefer to drive the shaft 69 directly from the cam shaft 5a (FIGURE 1) in the manner diagrammatically illustrated therein, although it will be understood that any arrangement of gears which will produce this result may be employed.

As indicated by the arrows in FIGURES 5 and 6, adjacent control sleeves must rotate in opposite directions where two cylinders have common intake and exhaust passages; whereas if separate ducts are employed for each cylinder, all of the sleeves must rotate in the same direction. Since the relationship of the sleeve ports and piston positions is critical to proper operation of the engine, care must be taken in the positioning of the driving gears 68 to insure proper synchronizing; and to this end adequate witness marks should be provided to permit proper adjustment.

Referring again to FIGURE 4, it will be noted that the tip of each rocker 7 is forked in order to apply a more even pressure to rest 58. The rockers 7 are spaced along a hollow shaft 71 mounted in supports 72 and positioned by means of alignment springs 73. The hollow shaft 71 is adapted to carry engine lubricating oil under pressure to various parts of the engine. Thus, as seen in FIGURE 2, the hollow shaft has a port 74 which communicates with oil groove 74a provided on the periphery of shaft 71, said groove and ports 75, 76, 77 and 78 being aligned to supply lubricant to the rocker rest 58, the helical drive gear 38, the ball bearing assembly 25, and the push rod 6. The helical gear 68 will pick up lubricant from the face of the driven gear 38; and lubricating oil which overflows from the rocker rest on to the spring retainer may pass downwardly through lubrication ports 79 into the valve spring chamber to lubricate roller bearing assembly 54. As seen in FIGURE 4, wedge shaped oil ports 80 are provided at the periphery of the valve spring retainer 56 to allow the retainer to rotate within the sleeve on a film of oil. The valve spring chamber 30 is provided with oil ports 81 (FIGURE 2) at its lower end to allow oil to flow out beneath the ball bearing assembly 25; and oil from the ball bearing assembly will be drained through ports 82 in the raised ring 17. Lubrication of the space between the valve guide 45 and the valve stem 44 is provided by means of ports 83 opening inwardly from the valve spring chamber 30. It will be noted that the ports 83 are spaced slightly above the oil drainage ports 81 in the periphery of the sleeve; since the guide and stem are theoretically concentric, friction is at a minimum, and therefore this arrangement prevents an excess of lubricant from accumulating in this area. Finally, the movement of the various parts of the engine will create an oil mist beneath the cover 15 within which the various moving parts operate. The lubricating oil from the head will drain back to the pump through the push rod channels or through other suitable drain means not shown.

Figures 12, 13:
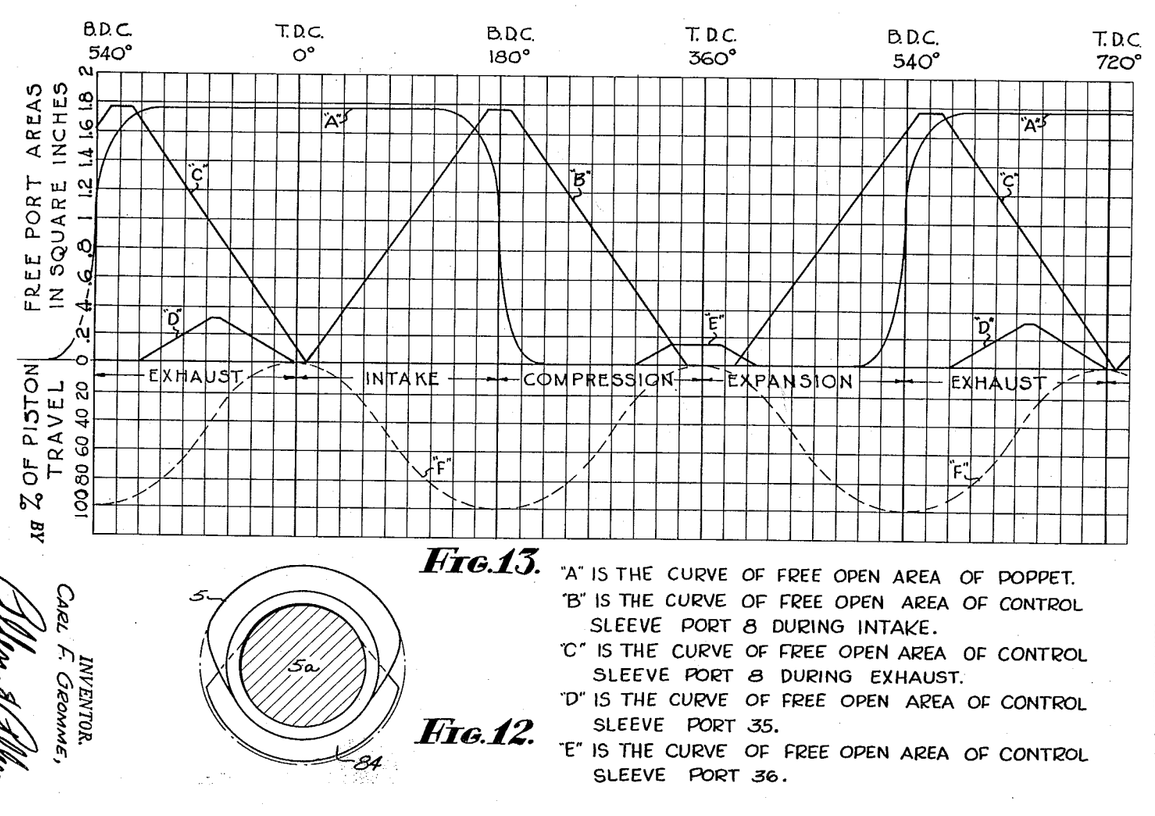
FIGURE 12 is a schematic view of the cam profile of the actuating cam for the poppet valve.
FIGURE 13 is a graph plotting a series of curves illustrating the operating cycle of each engine cylinder.

Figure 12 illustrates the correct cam profile for use with the invention. It includes a steady rise for 80° of crank shaft revolution, a constant or dwell for 280° of revolution, and a steady descent for 80° of revolution. Since cam speed equals one-half crank shaft speed, the number of degrees of the cam devoted to the rise, dwell, and descent equal one-half those figures given. The cam will be positioned relative to the engine crank shaft so that the valve 44 begins to open at 40° before the bottom dead center position of the piston. It is fully opened by 40° after bottom dead center, and remains open for the next 140° to complete the exhaust stroke and allow for the scavenging process. The valve is then held open for the next 140° to allow for the intake period, and begins to close 40° before bottom dead center. Closing continues until 40° after bottom dead center, when the intake stroke is fully completed and the valve is seated. During the remainder of the cycle, i.e. compression and expansion, the valve remains seated. At 84, I have indicated a counter weight which should be attached to the cam shaft 5a beside each cam to maintain static and dynamic balance in the cam shaft. It is to be understood that the exemplary timing of the valve is arbitrary, and may be altered as particular conditions demand.

The chart of FIGURE 13 plots one complete engine cycle of 720° of crank shaft revolution plus one exhaust period of 180°+40°. The absissae indicate degrees of revolution with the top dead center and bottom dead center position of the crank shaft being identified. Spacing of absissae are 20° each. The ordinates represent free port opening at any given crank shaft position in square inches. The ordinates also indicate the percentage of stroke a piston will have traveled from the top dead center position at any crank position. The dashed "sine" curve is based upon a connecting rod crank radius ratio of four and is identified as curve "F." The remainder of the curves are identified in the indicia accompanying the chart.

*The Combustion Chamber*

A further and important feature of my invention lies in the design of the combustion chamber 67 which is illustrated in FIGURES 2 and 3 of the drawings. I provide a "quench" area 67a of close clearance at the periphery of the piston between the piston head and the head block. This area serves to direct the fuel and air mixture to be burned toward the center of the combustion chamber; furthermore, because of the hollow portion of the piston head and the inset positioning of the valve, the rapid ejection of fuel from the "quench" area takes place in a substantially horizontal plane and does not impinge on either the piston head nor the valve. The fact of non-impingement is advantageous in that the fuel vapor does not exert a scrubbing action on any surface and thus avoids the disturbance of the boundary layers of gas molecules which are important in heat transmission through the walls of the combustion chamber or cylinder head. The "quench" area is such that virtually no combustion takes place there; and the "quench" area therefore remains relatively cool and serves to effect heat transfer from other portions of the piston. As will be evident from FIGURE 3 of the drawings, the clearance between the piston head and the valve at the end of the exhaust stroke (righthand portion of FIGURE 3) is minimal to allow the "scavenging air" to remove all but a fraction of the products of combustion and to effect maximum cooling of the combustion chamber.

The relatively low temperature of combustion achieved by means of the "quench" area of the combustion chamber, the single valve, and the secondary cooling system, dictates the use of lean mixxtures, which in turn means a low flame speed during combustion. I compensate for this low flame speed by minimizing flame travel distance and inducing a high degree of turbulence in the combustion chamber. Turbulence is inherent in the design since the fuel enters through port 9 more or less tangentially during the greater part of the induction period and acquires a high rotational speed; then the last portions of the inducted charge enters more or less perpendicularly to the rotating air-fuel mass; and finally the action of the combustion chamber in forcing the mixture to be burned towards the center of the chamber thus maintaining turbulence at least until the firing of the spark. Flame travel distance is minimized by placing the spark at or near the geometric center of the combustion chamber; and as will be apparent, this is accomplished by placing the spark ignition elements in the center of the valve head. By means of these compensating factors, the time of combustion is kept very short and high engine speeds can be attained in spite of the lean mixture. As stated earlier, I believe that the use of internal cooling eliminates the need for using rich fuel and air mixtures for the purpose of cooling to reduce "knock," particularly under low speed-high load conditions; furthermore, both conservation of fuel and thermal efficiency of my design indicates the use of lean mixtures. Therefore, the formation of carbon deposits will be reduced and the frequency of cleaning the combustion chamber will be minimized.

Having thus described my invention in an exemplary embodiment, and with the understanding that modification may be made in it without departing from its spirit and purpose, what I desire to secure and protect by Letters Patent is:

1. In an internal combustion engine having an engine block, a cylinder in said block, a piston in said cylinder, a crank shaft, and means connecting said piston to said crank shaft; a head block overlying said engine block, a bore in said head block immediately above and in alignment with said cylinder, said bore terminating at its lower end in a valve port having a seat, a sleeve rotatably mounted in said bore, means for rotating said sleeve in timed relation to said crank shaft, a valve having a head adapted to seat against said valve seat and a stem projecting upwardly through said sleeve, means within said sleeve mounting said valve for reciprocating and rotating movement relative thereto, means for reciprocating said valve in timed relation to the rotation of said sleeve to open and close said valve port, a chamber in said sleeve in communication with said valve seat and adapted, when said valve port is open, to communicate with said cylinder, a main port in said sleeve in the area of said chamber, intake and exhaust passages opening into said bore and positioned to be opened and closed by the said main port in said sleeve, and means in association with said sleeve for introducing an increment of air into said chamber when at least a portion of said main port is in communication with said intake passage and said valve port is closed, whereby any residual air-fuel mixture in said chamber is returned to said intake passage.

2. The internal combustion engine claimed in claim 1, including spark ignition means mounted in the face of said valve.

3. The internal combustion engine claimed in claim 2 wherein the means for introducing air into said chamber comprises a duct in said head block, a second chamber in said sleeve having at least one secondary port therein in communication with a said duct in said head block, wherein said second chamber communicates with said first named chamber, and wherein said duct is connected to a source of air under pressure.

4. The internal combustion engine claimed in claim 3 wherein said second chamber has a pair of secondary ports therein lying in spaced apart relation and positioned to be sequentially presented to said duct, whereby two separate increments of air will be introduced into said second chamber.

5. The internal combustion engine claimed in claim 4 wherein said pair of secondary ports are of unequal size, wherein the smaller of said secondary ports is positioned to be in communication with said duct when a portion at least of said main port is in communication with said intake passage and said valve port is closed, and wherein the remaining secondary port is adapted to be in communication with the said duct when said main port is in communication with said exhaust passage and said valve port is opened.

6. In a four cycle internal combustion engine having an engine block, a cylinder in said block, a piston in said cylinder, a crank shaft, and means connecting said piston to said crank shaft for reciprocating movement within said cylinder; a head block overlying and secured to said engine block, an elongated bore in said head block immediately above and in coaxial alignment with said cylinder, said bore terminating at its lower end in a valve port having a seat, an elongated control sleeve rotatably mounted in said bore, means for rotating said control sleeve in timed relation to said engine crank shaft, a single poppet valve having a head adapted to seat against said valve seat and a stem extending upwardly through said sleeve, means within said sleeve mounting said poppet valve for reciprocating and rotary movement relative thereto, means operatively connected to the upper end of said valve stem for reciprocating said poppet valve from an open to a closed position in timed relation to the movement of said crank shaft, a first chamber in said sleeve arranged to communicate with said cylinder when said valve is opened, a main port in said sleeve in communication with said first chamber, intake and exhaust passages in said head block opening into said bore and position to be sequentially opened and closed by said main port, whereby a combustible mixture may be introduced into said first chamber when said port is in communication with said intake passage and products of combustion exhausted from said chamber when said main port is in communication with said exhaust passage, a second chamber in said sleeve, at least one passageway connecting said first and second chambers, a duct in said head block opening into said bore in the area of said second chamber, a plurality of spaced apart secondary ports in said second chamber for sequentially communicating with said duct, means for supplying air under pressure to said duct, whereby when said secondary ports are in communication with said duct, increments of air will be introduced into said second chamber in timed relation to the opening and closing of said intake and exhaust passages and said valve port, said piston and said poppet valve defining between them a combustion chamber at the upper end of said cylinder, and spark ignition means in said combustion chamber.

7. The internal combustion engine claimed in claim 6 wherein said spark ignition means comprises a pair of electrodes mounted in the face of said poppet valve.

8. The internal combustion engine claimed in claim 7 wherein said combustion chamber is formed in part by recessing the center portion of the uppermost surface of said piston and by recessing said valve port and seat inwardly with respect to the lowermost surface of said head block, and wherein, when said piston is in its upper position, the periphery of said combustion chamber is defined by an annular quench area having closely spaced horizontally disposed upper and lower wall surfaces which open inwardly to an enlarged combustion area having non-horizontal wall surfaces.

9. The internal combustion engine claimed in claim 6 wherein said second chamber in the control sleeve has a pair of spaced apart secondary ports of unequal size therein adapted to be sequentially presented to said duct, wherein the smaller of said secondary ports is positioned to communicate with said duct when the main port in said first chamber is in at least in communication with said intake passage and said poppet valve is closed, whereby combustible material in said first chamber will be returned to said intake passage.

10. The internal combustion engine claimed in claim 9 wherein the larger of the said secondary ports is positioned to communicate with said duct when said main port in said first chamber is in communication with said exhaust passage and said poppet valve is open, whereby air introduced into said second chamber will flow into said first chamber and said combustion chamber to exhaust products of combustion therefrom.

11. The internal combustion engine claimed in claim 10 wherein the passageways connecting said first and second chambers lie on the side of said sleeve opposite the main port in said first chamber.

12. The internal combustion engine claimed in claim 11 including a third chamber in said control sleeve, and spring means in said third chamber operatively connected to said valve stem and acting to urge said valve to the closed position.

13. The internal combustion engine claimed in claim 12 including sealing means between said control sleeve and said bore in the areas between said first and second chambers and between said second and third chambers.

14. In an internal combustion engine having an engine block, a cylinder in said block, a piston in said cylinder, a crank shaft, and means operatively connecting said piston to said crank shaft for reciprocating movement; a head block secured to said engine block, an elongated bore in said head block immediately above and in alignment with said cylinder, said cylinder and said bore defining a combustion chamber therebetween, a valve port having a seat at the lower end of said bore, a single valve having a head adapted to close said valve port when seated against said valve seat and a stem projecting upwardly through said bore centrally thereof, an elongated sleeve rotatably mounted in said bore, means within said sleeve journaling said valve stem for both reciprocating and rotary movement, said valve stem projecting upwardly beyond the upper end of said sleeve, a rocker arm operatively connected to the projecting upper end of said valve stem, a helical drive gear surrounding the upper end of said sleeve, a driven helical gear in meshing engagement with said drive gear, means for actuating said rocker arm and driving said driven helical gear in timed relation to the movement of said crank shaft and piston, whereby to open and close said valve port and rotate said sleeve in timed relation, intake and exhaust passages in said head block opening into said bore, a chamber in said sleeve having a port positioned to sequentially communicate with said intake and exhaust passages, and means for introducing increments of air into said chamber in timed relation to the opening and closing of said valve port and the rotation of said sleeve, said last named means comprising a second chamber in said sleeve overlying said first named chamber and in communication therewith, said second chamber having a plurality of spaced apart ports therein positioned to communicate with an air duct opening into said bore, whereby to introduce increments of air into said chamber in timed relation to the opening and closing of said inlet and outlet passages and said valve port.

15. The engine claimed in claim 14, wherein the means for introducing increments of air into said chamber comprises a second chamber in said sleeve overlying said first named chamber and in communication therewith, said second chamber having at least one port therein positioned to communicate with an air duct opening into said bore.

16. The engine claimed in claim 15 wherein said combustion chamber has an annular "quench" area in which the uppermost surface of the piston has a planar marginal area lying in closely spaced parallel relation to a planar marginal area of said head surrounding said valve port, the central portion of said combustion chamber being defined by a centrally disposed generally cup-shaped recess in the upper surface of said piston, which recess underlies the head of said valve, and wherein spark ignition means are mounted in the head of said valve and positioned to lie at essentially the geometric center of said combustion chamber.

References Cited in the file of this patent

UNITED STATES PATENTS

| | | |
|---|---|---|
| 1,225,310 | Burkett | May 8, 1917 |
| 1,259,728 | Eastman | Mar. 19, 1918 |
| 1,325,904 | Palm | Dec. 23, 1919 |
| 1,393,174 | Shepard | Oct. 11, 1921 |
| 1,414,987 | Loeffler et al. | May 2, 1922 |
| 1,542,476 | Sargent | June 16, 1925 |
| 2,049,186 | Zahodiakin | July 28, 1936 |
| 2,471,509 | Anderson | May 31, 1949 |